United States Patent [19]

Mosier et al.

[11] Patent Number: 5,360,868

[45] Date of Patent: Nov. 1, 1994

[54] POLYOLEFIN COMPOSITIONS HAVING A HIGH BALANCE OF STIFFNESS AND IMPACT STRENGTH

[75] Inventors: Douglas D. Mosier, DeWitt; Mark E. Barrera, Lansing; Stephen M. Dwyer, Okemos, all of Mich.

[73] Assignee: HIMONT Incorporated, Wilmington, Del.

[21] Appl. No.: 113,939

[22] Filed: Aug. 30, 1993

[51] Int. Cl.$^5$ .................... C08L 23/18; C08L 23/10; C08L 53/00

[52] U.S. Cl. .................... 525/89; 525/95; 525/88; 525/240; 524/528; 524/505

[58] Field of Search ............ 525/88, 95, 89, 240

[56] References Cited

U.S. PATENT DOCUMENTS

| | | | |
|---|---|---|---|
| 4,621,114 | 11/1986 | Watanabe | 525/88 |
| 5,001,182 | 3/1991 | Maruya et al. | 524/427 |
| 5,173,536 | 12/1992 | Ficker | 525/88 |
| 5,210,139 | 5/1993 | Huff et al. | 525/88 |
| 5,212,246 | 5/1993 | Ogale | 525/95 |
| 5,218,047 | 6/1993 | Schwager | 525/95 |
| 5,286,564 | 2/1994 | Cecchin et al. | 525/240 |
| 5,298,561 | 3/1994 | Cecchin et al. | 525/240 |
| 5,302,454 | 4/1994 | Cecchin et al. | 525/240 |

FOREIGN PATENT DOCUMENTS

| | | |
|---|---|---|
| 0496625 | 7/1992 | European Pat. Off. . |
| 0519725 | 12/1992 | European Pat. Off. . |
| 1140659 | 6/1976 | United Kingdom ............ 525/88 |

*Primary Examiner*—Carman J. Seccuro, Jr.

[57] ABSTRACT

Disclosed are polyolefin compositions comprising (A) a propylene homopolymer or a crystalline copolymer of propylene and ethylene or a $C_{4-8}$ alpha-olefin, (B) an olefin polymer composition, and optionally either, (C) a propylene polymer composition or (D) an olefin polymer rubber.

15 Claims, No Drawings

POLYOLEFIN COMPOSITIONS HAVING A HIGH BALANCE OF STIFFNESS AND IMPACT STRENGTH

FIELD OF THE INVENTION

This invention relates to polyolefin compositions. More particularly, this invention relates to polyolefin compositions having improved coating adhesion, processability, shrinkage and impact resistance at low temperatures.

BACKGROUND OF THE INVENTION

Polypropylene-based resins have high stiffness, heat resistance and processability. However, in applications which require high impact resistance, low temperature performance, dimensional stability and paintability, such as automotive parts and domestic appliances, polypropylene-based resins fall short. Therefore, attempts have been made to improve the above short comings of polypropylene-based resins, for example, adding copolymers of ethylene with alpha-olefins.

U.S. Pat. No. 5,001,182 describes a resin composition comprising a crystalline propylene-ethylene block copolymer, which contains a propylene polymer component, a propylene-ethylene copolymer component and an ethylene copolymer component; (b) a non-crystalline ethylene-$C_{3-6}$ alpha-olefin random copolymer component; and (c) a talc or calcium carbonate component.

In EP 0 519 725 disclosed is a thermoplastic polymer composition comprising a thermoplastic polymer component comprising an ethylene-propylene rubber, and ethylene copolymer and a propylene polymer, which is blended with talc. A similar composition is disclosed in EP 0 496 625.

SUMMARY OF THE INVENTION

Accordingly, this invention provides a polyolefin composition having improved paintability at high flexural modulus, low shrinkage, lower coefficient of linear thermal expansion, higher gloss and improved processability comprising (A) a crystalline propylene homopolymer or a crystalline copolymer of propylene and ethylene or a $C_{4-8}$ alpha-olefin, (B) an olefin polymer composition, and optionally either, (C) a propylene polymer composition or (D) an olefin polymer rubber.

DETAILED DESCRIPTION OF THE INVENTION

All parts and percentages used in this application are by weight unless otherwise specified. Ambient or room temperature is approximately 25° C.

The polyolefin composition of the present invention comprises:

I. (A) from 10 to 80%, preferably 20 to 80% and most preferably 30 to 60%, by weight, of a crystalline propylene homopolymer or of a crystalline copolymer of propylene and ethylene or a $C_{4-8}$ alpha-olefin and (B) from 10 to 80%, preferably 20 to 80%, and most preferably 30 to 60%, by weight of an olefin polymer composition; or II. (A) from 10 to 80%, preferably 10 to 70%, and most preferably 30 to 60%, by weight, of a crystalline propylene homopolymer or of a crystalline copolymer of propylene and ethylene or a $C_{4-8}$ alpha-olefin, (B) from 10 to 80%, preferably 30 to 60% by weight of an olefin polymer composition and (C) from 10 to 70%, preferably from 20 to 60% by weight, of a propylene polymer composition; or III. (A) from 10 to 80%, preferably 10 to 70%, and most preferably 30 to 60%, by weight of a crystalline propylene homopolymer or of a crystalline copolymer of propylene and ethylene or a $C_{4-8}$ alpha-olefin, (B) from 10 to 80%, preferably 10 to 70%, and most preferably 30 to 60%, by weight of an olefin polymer composition and (D) from 5 to 40%, preferably from 10 to 30%, by weight of an olefin polymer rubber.

Component (A) used in the polyolefin compositions of the present invention can be a crystalline propylene homopolymer having an isotactic index of greater than 80, preferably from 85 to 99, and most preferably from 90 to 99, or a crystalline copolymer of propylene and ethylene or a $C_{4-8}$ alpha-olefin, provided that when the olefin is ethylene, the maximum polymerized ethylene content is about 10%, preferably 4–9%, and when the olefin is a $C_{4-8}$ alpha-olefin, the maximum polymerized content thereof is about 20%, preferably 16%.

Component (B) used in the polyolefin compositions of the present invention is an olefin polymer composition consisting essentially of (i) from 25 to 50%, preferably from 35 to 50%, by weight, of a crystalline propylene homopolymer with a solubility in xylene at room temperature of less than or equal to 5%, and preferably less than or equal to 3%, or a crystalline copolymer of propylene with ethylene or a $C_{4-8}$ alpha-olefin having an ethylene or alpha-olefin content preferably of 0.5 to 3%, and a solubility in xylene at room temperature of from less than or equal to 5%, and preferably less than 3%; and (ii) from 50 to 75%, preferably from 50 to 65%, by weight, of an amorphous copolymer of ethylene with a $C_{4-8}$ alpha-olefin, wherein said alpha-olefin content is preferably from 10 to 20%, and said amorphous copolymer preferably is from 10 to 40% soluble in xylene at room temperature.

Component (C) used in the compositions of the present invention is a propylene polymer composition composition selected from the group consisting of:

(1) a propylene polymer material consisting essentially of:

(a) from 10 to 60%, preferably from 20 to 50%, by weight of a crystalline homopolymer polypropylene with isotactic index greater than 90, preferably 99, or of a crystalline propylene copolymer with ethylene, with a $CH_2\!=\!CHR$ olefin where R is a 2-6 carbon alkyl radical, or combinations thereof, containing over 85% by weight of propylene and having an isotactic index greater than 85, preferably greater than 90;

(b) from 8 to 40%, preferably 10 to 30%, by weight of a semi-crystalline, essentially linear copolymer fraction containing ethylene and propylene, having an ethylene content of greater than 50%, preferably greater than 55% and insoluble in xylene at room temperature; and (c) from 30 to 60%, preferably 30 to 50%, by weight of an amorphous ethylene-propylene copolymer fraction containing optionally small proportions of a diene, soluble in xylene at room temperature and containing 40 to 70% by weight ethylene, wherein individual components (a), (b), and (c) are present in amounts equal to 100% of component (C); or (2) a propylene polymer composition consisting essentially of:

(a) from 10 to 50% of a propylene homopolymer, preferably from 10 to 40%, and most preferably from 20 to 35%, having an isotactic index of from 80 to 99%, and preferably from 85 to 99%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii), wherein said copolymer contains from 85 to 99%, and preferably from 90 to 99% propylene and having an isotactic index greater than 80 to 99%, preferably greater than 85 to 99%;

(b) from 2 to 20% of a semi-crystalline, essentially linear copolymer fraction, preferably from 5 to 15%, having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, preferably from 60 to 95%, of both ethylene and alpha-olefin; and (iii) ethylene and an alpha-olefin, as defined in (a)(ii), containing over 55% up to 98%, preferably from 80 to 95%, of said alpha-olefin, which copolymer is insoluble in xylene at room temperature; and (c) from 40 to 80% of a copolymer fraction, preferably 50 to 70%, selected from the group consisting of a copolymer of (i) ethylene and propylene wherein the copolymer contains from 20% to less than 40%, preferably from 20 to 38%, most preferably 25 to 38% ethylene; (ii) ethylene, propylene, and an alpha-olefin, as defined in (a)(ii), wherein the alpha-olefin is present in an amount of from 1 to 10%, preferably from 1 to 5%, and the amount of ethylene and alpha-olefin present is from 20% to less than 40%; and (iii) ethylene and an alpha-olefin, as defined in (a)(ii), containing from 20 to less than 40%, preferably 20 to 38%, and most preferably 25 to 38% of the alpha-olefin, and optionally containing 0.5 to 10%, preferably 1 to 5% of a diene, said copolymer fraction being soluble in xylene at ambient temperature, and having an intrinsic viscosity preferably of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is preferably from about 65% to 80%, the weight ratio of (b)/(c) is preferably from 0.1 to about 0.3 and the total content of ethylene or $C_{4-8}$ alpha-olefin or combination thereof in (b+c) is less than 50%, and preferably from 20 to 45%, wherein the individual components (a), (b) and (c) are present in amounts equal to 100%.

The propylene polymer material of component (C)(1) is characterized as having at least one melting peak, determined by DSC, present at temperatures higher than 140° C.; a flex modulus of less than 700 MPa, preferably from 200 to 500 MPa; a Vicat softening point greater than 50° C.; a Shore A hardness greater than 80 and a Shore D hardness greater than 30; a tension set, at 75% strain, lower than 60%, and preferably from 20 to 50%; a tensile stress of greater than 6 MPa, and preferably from 8 to 20 MPa and a notched Izod resilience at −20° and −40° C. greater than 600 J/m.

The propylene polymer material of component (C)(2) is characterized as having at least one melt peak, determined by DSC, present at temperatures higher than 120° C., and at least one peak, relative to the vitreous transition, present at temperatures from −10° C. and −35° C. In addition, these compositions have a flexural modulus of less than 150 MPa, generally from 20 and 100 MPa; a tensile strength at yield of from 10 to 20 MPa, elongation at break over 400%; a tension set, at 75% strain, from 20% to 50%; a Shore D hardness from 20 and 35; haze value of less than 40%, preferably less than 35%, and do not break (no brittle impact failure) when an IZOD impact test is conducted at −50° C.

The olefin polymer rubber of component (D) used in the polyolefin composition of the present invention can be an ethylene-propylene copolymer rubber having an ethylene content of from 40 to 80%, preferably from 50 to 85%, or an ethylenepropylene-conjugated diene terpolymer rubber having an ethylene content of from 40 to 77%, preferably 45 to 75%, and a diene content of from 2 to 10%, and preferably from 3 to 8%.

Suitable $C_{4-8}$ alpha-olefins include butene-1, pentene-1, 4-methylpentene-1, hexene-1 and octene-1. Butene-1 is particularly preferred.

The diene, when present, is typically a butadiene, 1,4-hexadiene, 1,5-hexadiene, or ethylidene norbornene diene monomer and is typically present in component (C) in an amount of from 0.5 to 10%, preferably from 1 to 5%.

In addition to components (A), (B), (C) and (D), the compositions of the present invention can further contain from 2 to 50%, preferably 5 to 20% by weight of a mineral filler in particle form having an average diameter of from 0.1 to 10, preferably 1 to 5, micrometers.

Examples of said mineral fillers useful in the compositions of the present inventions include talc, calcium carbonate, silica, conventional clays, wollastonite, diamatomaceous earth, titanium oxide and zeolites. Preferably, the mineral filler is talc.

The propylene polymer material of (C)(1) and (C)(2) can be prepared with a polymerization process comprising at least two stages, where in the first stage the propylene or propylene and ethylene or said alpha-olefin or propylene, ethylene and alpha-olefin are polymerized to form (a), and in the following stages the mixtures of ethylene and propylene or said alpha-olefin or ethylene, propylene and said alpha-olefin, and optionally diene, are polymerized in the presence of (a) to form (b) and (c) using the catalyst and the method described in copending U.S. Ser. No. 07/515,936, filed Apr. 27, 1990, in the case of component (C)(1), and copending U.S. Ser. No. 07/734,390, filed Jul. 23, 1991, in the case of component (C)(2).

The olefin polymer composition of component (B) is generally prepared by sequential polymerization in two or more stages using highly stereospecific Ziegler-Natta catalysts. Fraction (B)(i) forms during the first stage of polymerization, while fraction (B)(ii) is formed during the subsequent polymerization stages in the presence of fraction (B)(i) formed in the first stage.

The polymerization of component (B) can be conducted in liquid phase, gas phase, or liquid-gas phase using separate reactors, all of which can be done either by batch or continuously. For example, it is possible to carry out the polymerization of fraction(B)(i) using liquid propylene as diluent, and the polymerization of fraction (B)(ii) in gas phase, without intermediate stages except for the partial degassing of the propylene. This is the preferred method.

The polymerization reactions of component (B) are carried out in an inert atmosphere in the presence of an inert hydrocarbon solvent or of a liquid or gaseous monomer.

Suitable inert hydrocarbon solvents include saturated hydrocarbons, such as propane, butane, hexane and heptane.

Hydrogen can be added as needed as a chain transfer agent for control of the molecular weight.

The reaction temperature in the polymerization of fraction (B)(i) and for the polymerization of fraction (B)(ii) can be the same or different, and is generally from 40° C. to 90° C., preferably 50° to 80° C. for the polymerization of fraction (B)(i), and 40° to 70° C. for the polymerization of Fraction (B) (ii).

The pressure of the polymerization of fraction (B)(i), if carried out in liquid monomer, is the one which competes with the vapor pressure of the liquid propylene at the operating temperature used, eventually modified by the vapor pressure of the small quantity of inert diluent used to feed the catalyst mixture, and the over pressure of optional monomers and the hydrogen used as molecular weight regulator.

The pressure of the polymerization of fraction (B)(i), if done in gas phase, can be from 5 to 30 atm. The residence times relative to the two stages depend on the desired ratio between fraction (B)(i) and (B)(ii), and are usually from 15 min. to 8 hours.

The catalyst used in the polymerization of component (B) comprises the reaction product of 1) a solid component containing a halogen-containing titanium compound and an electron-donor compound supported on an activated magnesium chloride, characterized in that they are capable of producing polypropylene with an isotactic index greater than or equal to 96%, preferably 99%, 2) a non-halogen containing Al-trialkyl compound and 3) an electron-donor compound (external donor).

Suitable titanium compounds include those with at least one Ti-halogen bond, such as halides and alkoxy halides of titanium.

In order to obtain these olefin polymer compositions in the form of flowable spherical particles having a high bulk density, the solid catalyst component must have a) a surface area smaller than 100 m$^2$/g, preferably between 50 and 80 m$^2$/g, b) a porosity from 0.25 to 0.4 cc/g. and c) an X-ray spectrum, where the magnesium chloride reflections appear, showing the presence of a halo between the angles $2\nu$ of 33.5° and 35° and by the absence of the reflection at $2\nu$ of 14.95°. The symbol $\nu$ = Bragg angle.

The solid catalyst component is prepared by forming an adduct of magnesium dichloride and an alcohol, such as ethanol, propanol, butanol and 2-ethylhexanol, containing generally 3 moles of alcohol per mole of MgCl$_2$, emulsifying the adduct, cooling the emulsion quickly to cause the adduct to solidify into spherical particles, and partially dealcoholating the particulate adduct by gradually increasing the temperature from 50° C. to 130° C. for a period of time sufficient to reduce the alcohol content from 3 moles to 1–1.5 moles per mole of MgCl$_2$. The partially dealcoholated adduct is then suspended in TiCl$_4$ at 0° C., such that the concentration of adduct to TiCl$_4$ is 40–50 g/l TiCl$_4$. The mixture is then heated to a temperature of 80° C. to 135° C. for a period of about 1–2 hr. When the temperature reaches 40° C., sufficient electron donor is added so that the desired molar ratio of Mg to electron donor is obtained.

An electron-donor compound selected preferably among the alkyl, cycloalkyl, and aryl phthalates, such as for example diisobutyl, di-n-butyl, and di-n-octyl phthalate, is added to the TiCl$_4$.

When the heat treatment period has ended, the excess hot TiCl$_4$ is separated by filtration or sedimentation, and the treatment with TiCl$_4$ is repeated one or more times. The solid is then washed with a suitable inert hydrocarbon compound, such as hexane or heptane, and dried.

The solid catalyst component typically has the following characteristics:

| | |
|---|---|
| Surface area: | less than 100 m$^2$/g, preferably between 50 and 80 m$^2$/g |
| Porosity: | 0.25–0.4 cc/g |
| Pore volume distribution: | 50% of the pores have a radius greater than 100 angstroms. |
| X-ray spectrum: | where the Mg chloride reflections appear, showing a halo with maximum intensity between angles of $2\theta$ of 33.5°and 35°, and where the reflection at $2\theta$ of 14.95° is absent. |

The catalyst is obtained by mixing the solid catalyst component with a trialkyl aluminum compound, preferably triethyl aluminum and triisobutyl aluminum, and an electron-donor compound.

Various electron donor compounds are known in the art. The preferred electron donor compounds are those silane compounds having the formula R'R"Si(OR)$_2$ where R' and R" may be the same or different and are C$_{1-18}$ normal or branched alkyl, C$_{5-18}$ cycloalkyl, or C$_{6-18}$ aryl radicals, and R is a C$_{1-4}$ alkyl radical.

Typical silane compounds which may be used include diphenyldimethoxysilane, dicyclohexyldimethoxysilane, methyl-t-butyldimethoxysilane, diisopropyldimethoxysilane, dicyclopentyldimethoxysilane, cyclohexylmethyldimethoxysilane and phenyltrimethoxysilane.

The Al/Ti ratio is typically between 10 and 200 and the Al/silane molar ratio between 1/1 and 1/100.

The catalysts may be precontacted with small quantities of olefin monomer (prepolymerization), maintaining the catalyst in suspension in a hydrocarbon solvent and polymerizing at a temperature from room temperature to 60° C. for a time sufficient to produce a quantity of polymer from 0.5 to 3 times the weight of the catalyst.

This prepolymerization also can be done in liquid or gaseous monomer to produce, in this case, a quantity of polymer up to 1000 times the catalyst weight.

The content and amount of catalyst residue in the thermoplastic olefin polymers of this invention is sufficiently small so as to make the removal of catalyst residue, typically referred to as deashing, unnecessary.

In addition to the mineral fillers discussed above, the composition of the present invention may further contain stabilizers, other fillers and reinforcing agents, e.g. carbon black and glass beads and fibers.

The polyolefin composition of the present invention can be physically blended or admixed in any conventional mixing apparatus, such as an extruder or a Banbury mixer, or they can be chemically blended by sequential polymerization in a series of reactors.

The present invention will be illustrated in greater detail with reference to the examples of the invention set forth below.

In the examples set forth below Component (B) was prepared according to the following general procedure.

Preparation of the Catalyst

Into a reactor equipped with an agitator, in inert atmosphere, are introduced 28.4 g of $MgCl_2$, 49.5 g of anhydrous ethanol, 100 ml of ROL OB/30 Vaseline oil, and 100 ml of silicon oil with a viscosity of 350 cs. The ingredients are heated to 120° C. until the $MgCl_2$ is dissolved. The hot reaction mixture is then transferred to a 1500 ml vessel equipped with a T-45 N Ultra Turrax agitator and containing 150 ml of Vaseline oil and 150 ml of silicon oil. The temperature is maintained at 120° C. and agitation continues for 3 minutes at 3000 rpm. The mixture is then transferred to a 2 liter vessel, equipped with an agitator, containing 1000 ml of anhydrous n-heptane cooled to 0° C. The particles obtained are recovered by filtration and washed with 500 ml of n-hexane, then the temperature is increased from 30° C. to 180° C. in nitrogen flow for a period of time sufficient to reduce the alcohol content of the adduct formed from 3 to 2.1 moles per mole of $MgCl_2$.

25 g of the adduct is transferred to a reactor equipped with an agitator and containing 625 ml of $TiCl_4$, at 0° C. with agitation, raising the temperature to 100° C. over a period of one hour. When the temperature reaches 40° C., diisobutyl phthalate is added in an amount such that the magnesium's molar ratio with respect to the phthalate is 8.

The ingredients of the reactor are heated to 100° C. for two hours while agitating, and the solid is allowed to settle. the hot liquid is syphoned off, and 550 ml of $TiCl_4$ is added. the mixture is heated to 120° C. and maintained for one hour while agitating. The solid is allowed to settle and the hot liquid is syphoned. The solid obtained is washed six times with 200 ml of n-hexane at 60° C., and then again three more times at room temperature.

Polymerization

The polymerization is carried out continuously in a series of reactors equipped with devices to transfer the product from one reactor to the one immediately next to it.

In the gas phase, hydrogen and monomers are continuously fed and analyzed in order to constantly maintain the desired concentrations.

Into a reactor at 0° C. for 3 minutes, a mixture of triethylaluminum (TEAL) activator and dicyclohexyldimethoxysilane, TEAL/silane weight ratio of 3-5, is contacted with the catalyst component obtained above such that the TEAL/Ti molar ratio.

The precontacted catalyst is then transferred to a reactor containing an excess of liquid propylene, and prepolymerized for a period of 24 minutes at 25° C.

The prepolymer is transferred to the first gas phase reactor where the homopolymerization of the propylene occurs so as to form fraction (B)(i). The fraction (B)(i) thus obtained is transferred to the second reactor, where the ethylene and butene-1 are copolymerized with the propylene to obtain fraction (B)(ii).

At the end of the second stage polymerization reaction the powder is discharged, stabilized and then oven dried under a nitrogen stream at 60° C.

The ingredients, relative operating conditions and test results are set forth in Table A.

TABLE A

| First Reactor | |
|---|---|
| Temperature, °C. | 70 |
| Pressure, bar | 22 |
| $H_2/C_3$, mol % | 0.05 |
| Second Reactor | |
| Temperature, °C. | 70 |
| Pressure, bar | 12 |
| $H_2/C_2$, mol % | 0.45 |
| $C_2/C_2 + C_4$, mol. ratio | 0.37 |
| Final Product | |
| $C_3$, wt. % | 35 |
| $C_2/C_4$, wt. % | 65 |
| Ethylene content, wt. % | 53 |
| Butene content, wt. % | 12 |
| Xylene soluble, wt. % | 23 |
| Intrinsic Vis. Xyl. Sol. (in tetraline), dl/g | 1.4 |
| MFR, g/10 min. | 5.2 |
| Flexural Modulus, MPa | 600 |
| Tensile Strength @ yield, MPa | 14.8 |
| Elongation @ break, % | >500 |
| Notched Izod, J/m | |
| @ −30° C. | 98 |
| @ −40° C. | 61 |

Unless otherwise specified, the following analytical methods are used to characterize the compositions of the present invention.

| Analytical Methods | |
|---|---|
| Properties | Method |
| Melt Flow Rate, g/10 min. (MFR) | ASTM D1238-89, Condition L, Method A |
| Intrinsic Melt Viscosity (IMV) | ASTM D3835-79 |
| Specific Gravity | ASTM D792-86 |
| Tensile Strength at yield and at break | ASTM D638-89 |
| % Elongation at yield and at break | ASTM D638-89 |
| Flexural Modulus (tangent) | ASTM D790-86 |
| Hardness-Rubber Property Durometer (Shore D) | ASTM D2240 |
| Rockwell | ASTM D785-89 |
| Shrinkage (before and afterbake) | ASTM D955-89 |
| Dynatup | ASTM D3763-86 |
| Coefficient of Linear Thermal Expansion (CLTE) | ASTM D696-79 |

Paint Adhesion Test—To determine paint adhesion properties, panels are painted with Morton HP21054-4B1 adhesion promoter to obtain 0.2 mil DFT, flashed for 2 minutes, and primed with PPG HAP 09440 weatherable primer to obtain 1.0 mil DFT minimum, and then flashed for 10 minutes. Then the panels are baked for 30 minutes at 250° C. and allowed to cool for a minimum of one hour prior to adhesion testing. After cooling, the panels are scribed in the bottom left corner away from the gate using X-scribe tool template and a utility knife, making sure that the depth of penetration is through the paint film into the substrate. Tape is placed on the surface of the panel over the X. The tape is pulled off of the panel with a quick upward pull 90 degrees to the panel surface. Five tape pulls are run on each panel. The paint adhesion loss (paint removal) is monitored each pull and recorded as a percent of the surface covered by the tape.

Accelerated Weathering Test—Xenon weathering was determined according to SAE J1960 specification. A Xenon Arc apparatus is used to weather each material for 2500 KJ/$m^2$ (1.3 KJ/hr rate using J1960) with color checks every 500 KJ/$m^2$. Color checks are run using a Macbeth Color Eye 2020 Plus Colorimeter (Model M2020 PL) according to SAE J1545 using Cie-Lab color space, illuminant D, 10 degree observer. Delta E color shift is monitored. Delta E=Square root ((Delta L)$^2$+(Delta a)$^2$+(Delta b)$^2$). The Automotive specification requirement is a Delta E<3.0, without any visible surface defects.

Taber Scratch Test—To determine the durability of painted surface of materials at elevated temperature (180° F.). Panels are prepared according to the adhesion paint test method described above. The panels are trimmed to a 4×4 square and the center of each panel is drilled to allow for mounting to the test apparatus, Model: 5130 Abraser w/Scratch Kit from Taber Industries. The panels are preheated for 1 hour at 180° F. then removed from the oven one at a time and immediately fastened to the test table of the testing apparatus and tested. The apparatus is set for 100 cycles, using 2 lb load with ¼" wide stylist. Documentation is made at the revolution (1 cycle/second=1 revolution) when the first sign of paint damage or removal occurs, which constitutes fail at that number of cycles. A pass is 100 complete cycles without paint damage.

Examples 1 and 2

The polyolefin compositions of this invention are produced by a general procedure comprising blending in a 1500 ml Bolling 00 mixer manufactured by Stewart Bolling Inc., Polymer A, Polymer B, Polymer D, carbon black and Stabilizer 1, in the amounts set forth in Table 1A, until a homogeneous mixture is obtained, approximately 3 minutes. The mixture is then discharged at a mixer temperature chamber reading of 300 to 330° F. The batch is then put through a 2-roll mill manufactured by Reliable Rubber & Plastic Machinery Co. Inc. to press out the material for granulation. The material is then granulated in a Conair Wor-Tex JC-5L granulator manufactured by Conair.

The granulated material is then injection molded into test specimens using a VanDorn 120 ton injection molder manufactured by VanDorn Plastics Machinery Co.

The properties are set forth below in Table 1B.

Control 1

A physical blend of Polymer F was prepared according to the general procedure of Example 1, in the amount set forth below in Table 1A.

The physical properties are set forth below in Table 1B.

Examples 3 to 5

The compositions are prepared according to the general procedure of Examples 1 and 2, except that Polymer E instead of Polymer D is used in varying amounts as set forth below in Table 1A.

The physical properties are set forth below in Table 1B.

TABLE 1A

| INGREDIENTS* | CON 1 | EX 1 | EX 2 | EX 3 | EX 4 | EX 5 |
| --- | --- | --- | --- | --- | --- | --- |
| Polymer A | — | 50 | 50 | 50 | 55 | 55 |
| Polymer B | — | 20 | 30 | 30 | 25 | 30 |
| Polymer D | — | 30 | 20 | — | — | — |
| Polymer E | — | — | — | 20 | 20 | 15 |
| Carbon Black | — | 4 | 4 | 4 | 4 | 4 |
| Stabilizer 1 | — | 0.2 | 0.2 | 0.2 | 0.2 | 0.2 |

TABLE 1A-continued

| INGREDIENTS* | CON 1 | EX 1 | EX 2 | EX 3 | EX 4 | EX 5 |
| --- | --- | --- | --- | --- | --- | --- |
| Polymer F | 100 | — | — | — | — | — |

*Polymer A - a propylene homopolymer, in flake form, having a MFR of 12 dg/min.
Polymer B - an olefin polymer composition containing 35% of a propylene homopolymer and 65% of an ethylene-butene copolymer containing 53% ethylene, wherein said composition has a xylene solubles content of 23%.
Polymer D - a propylene polymer material containing (a) 40% propylene homopolymer, (b) 10% semi-crystalline, essentially linear propylene-ethylene copolymer fraction and (c) 50% of an amorphous ethylene-propylene copolymer fraction, which composition has a xylene solubles content of 51%.
Polymer E - a propylene polymer material containing (a) 30% of a propylene-ethylene random copolymer having an ethylene content of 3.3%, (b) 7% of semi-crystalline, essentially linear ethylene-propylene copolymer fraction containing 51.9% ethylene and (c) 63% of an amorphous ethylene-propylene copolymer fraction containing 31.1% ethylene, which composition has a xylene soluble content of 64%.
Carbon Black - Colonial 2447 concentrate 50:50 carbon black and linear low density polyethylene produced by Colonial Rubber.
Stabilizer 1 - Irganox B-225 2,2-bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate stabilizer and tris (2,4-di-tert-butylphenyl) phosphite stabilizer in a 50:50 blend.
Polymer F - a propylene polymer composition of 67% propylene-ethylene random copolymer having 97% of polymerized propylene units and 33% propylene-ethylene copolymer having 63% of polymerized ethylene units, and 0.20% of Stabilizer 1, which composition has a xylene soluble content of 25% and a MFR of 10.5 dg/min.

TABLE 1B

| PROPERTIES | CON 1 | EX 1 | EX 2 | EX 3 | EX 4 | EX 5 |
| --- | --- | --- | --- | --- | --- | --- |
| Melt Flow | 10.5 | 6.5 | 7.3 | 6.2 | 6.7 | 6.8 |
| Spec. Grav. | 0.89 | 0.89 | 0.89 | 0.89 | 0.89 | 0.89 |
| Tensile Str. @ Yield, psi | 1882 | 2345 | 2553 | 2411 | 2456 | 2741 |
| Tensile Str. @ Break, psi | 2569 | 2614 | 3038 | 3965 | 4047 | 4011 |
| Elongation @ Yield, % | 12 | 11 | 10 | 14 | 11.2 | 12.6 |
| Elongation @ Break, % | 772 | 664 | 709 | 841 | 871 | 768 |
| Flexural Modulus, 1 × 4 Molded, kpsi | 74 | 110 | 112 | 99 | 105 | 112 |
| Hardness D | 59 | 65 | 65 | 65 | 65 | 65 |
| Shrink | 11.6 | 13 | 12 | 11.1 | 11.4 | 14 |
| Afterbake | 16.3 | 16.7 | 15.7 | 15.3 | 15.5 | 17 |
| Dynatup @ −30° C. | | | | | | |
| E @ max, J | 24.9 | 28.4 | 27.3 | 26.4 | 28.3 | 28.7 |
| Total E, J | 56.1 | 61.1 | 58.7 | 50.5 | 52.5 | 51.4 |
| Deflection at Max, mm | 15.9 | 15.6 | 15 | 14.6 | 14.7 | 14.8 |
| Total Deflection, mm | 38.2 | 40 | 35 | 30.5 | 31.8 | 32.9 |
| Fracture mode | Duct | Duct | Duct | Duct | Duct | Duct |
| Paint Adhesion % Fail after 1 pull | | | | | | |
| Panel 1 | 5 | 5 | P | P | P | P |
| Panel 2 | 5 | 40 | P | P | 5 | P |
| Panel 3 | P | 55 | P | 5 | 25 | P |

As shown in Table 1, the compositions of the present invention demonstrate increased tensile strength, hardness, flexural modulus and paintability as compared to control 1, which demonstrates good paintability, but at low flexural modulus.

Control 2

A physical blend of Polymer G was prepared according to the general procedure of Example 1, in the amount set forth below in Table 2A.

The physical properties are set forth below in Table 2B.

Examples 6 to 9

The compositions are prepared according to the general procedure of Example 1, except that the compositions do not contain carbon black and the amounts of the polymers are varied as set forth in Table 2A.

The physical properties are set forth below in Table 2b.

TABLE 2A

| INGREDIENTS* | CON 2 | EX 6 | EX 7 | EX 8 | EX 9 |
|---|---|---|---|---|---|
| Polymer A | — | 40 | 50 | 60 | 60 |
| Polymer B | — | 30 | 30 | 30 | 20 |
| Polymer D | — | 30 | 20 | 10 | 20 |
| Stabilizer 1 | — | 0.2 | 0.2 | 0.2 | 0.2 |
| Polymer G | 100 | — | — | — | — |

*Polymer A - a propylene homopolymer, in flake form, having a MFR of 12 dg/min.
Polymer B - an olefin polymer composition containing 35% of a propylene homopolymer and 65% of an ethylene-butene copolymer containing 53% ethylene, wherein said composition has a xylene solubles content of 23%.
Polymer D - a propylene polymer material containing (a) 40% propylene homopolymer, (b) 10% semi-crystalline, essentially linear propylene-ethylene copolymer fraction and (c) 50% of an amorphous ethylene-propylene copolymer fraction, which composition has a xylene solubles content of 51%.
Polymer G - a mechanical blend comprising 70% of Profax 6201 propylene homopolymer having a MFR of 20 dg/min. commerically available from HIMONT U.S.A., Inc., 5% of high density polyethylene having a melt index of 6 g/10 min., and density of 0.954 g/cm$^3$ produced by Allied Signal, 25% Epsyn 2506 ethylene-propylene-ethylidene norbornene diene monomer rubber having an ethylene content of 56%, a diene content of 4.5%, Mooney ML$_{1+4}$@125° C. of 28 and MFR of 5.7 dg/min. available from Copolymer Chemical, 0.20% of Stabilizer 5, 0.10% of Stabilizer 6, 0.20% of Stabilizer 2 and 0.20% of Stabilizer 4.
Stabilizer 1 - Irganox B-225 2,2-bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate stabilizer and tris(2,4-di-tert-butylphenyl) phosphite stabilizer in a 50:50 blend.

TABLE 2B

| PROPERTIES | CON 2 | EX 6 | EX 7 | EX 8 | EX 9 |
|---|---|---|---|---|---|
| Melt Flow | 11.9 | 6.1 | 7.7 | 8.6 | 8.1 |
| IMV | 300 | 600 | 390 | 360 | 430 |
| Spec. Grav. | 0.89 | 0.89 | 0.89 | 0.89 | 0.89 |
| Tensile Str. @ Yield, psi | 2750 | 2790 | 3115 | 3465 | 3360 |
| Tensile Str. @ Break, psi | 2750 | 3860 | 4400 | 4830 | 4405 |
| Elongation @ Yield, % | 10.1 | 12.8 | 16.1 | 17.2 | 11.2 |
| Elongation @ Break, % | 380 | 505 | 560 | 555 | 520 |
| Flexural Modulus | | | | | |
| 1 × 4 Molded, kpsi | 125 | 122 | 128 | 147 | 145 |
| 1 × 4 Die cut, kpsi | 127 | 114 | 129 | 147 | 145 |
| Hardness D | 64 | 63 | 65 | 67 | 67 |
| Shrink | 11.8 | 11.6 | 12 | 11.9 | 13.6 |
| Afterbake | 15.2 | 14.4 | 14.9 | 14.9 | 16.3 |
| Dynatup @ −30° C. | | | | | |
| E @ Max, J | 24.3 | 25.6 | 27.0 | 19.6 | 27.1 |
| Total E, J | 39.8 | 43.0 | 45.6 | 20.8 | 40.7 |
| Deflection at Max, mm | 15.4 | 16.0 | 15.2 | 12.1 | 14.6 |
| Total Deflection, mm | 30.0 | 31.3 | 31.3 | 12.8 | 25.4 |
| Fracture mode | Duct | Duct | Duct | Brit | Duct |
| Dynatup @ 23° C. | | | | | |
| E @ Max, J | 17.0 | 17.3 | 16.9 | 20.1 | 19.4 |
| Total E, J | 28.2 | 36.1 | 34.1 | 36.5 | 35.6 |
| Deflection at Max, mm | 17.2 | 18.2 | 17.3 | 17.2 | 17.2 |
| Total Deflection, mm | 25.9 | 31.6 | 28.8 | 27.9 | 27.3 |
| Fracture mode | Duct | Duct | Duct | Duct | Duct |
| Paint Adhesion % Fail | | | | | |
| 1 Pull | P/* | P/6 | P/P | P/P | 6/4 |
| 2 Pull | 1/3 | 2/10 | P/1 | P/1 | 7/9 |
| 3 Pull | —/— | 4/18 | 1/2 | P/— | 12/16 |
| 4 Pull | 2/4 | —/31 | 2/— | P/— | 14/18 |
| 5 Pull | 3/9 | 5/33 | —/4 | 2/3 | 22/20 |

As shown in Table 2, the compositions of the present invention demonstrate increased tensile strength, elongation, hardness, flexural modulus and paintability as compared to control 2, which demonstrates good paintability, but a low flexural modulus.

Examples 10 to 13

The compositions are prepared according to the general procedure of Example 6, except that the amounts of the polymers are varied as set forth in Table 3A.

The physical properties are set forth below in Table 3B.

TABLE 3A

| INGREDIENTS* | EX 10 | EX 11 | EX 12 | EX 13 | CON 1 |
|---|---|---|---|---|---|
| Polymer A | 20 | 20 | 30 | 40 | — |
| Polymer B | 20 | 30 | 20 | 20 | — |
| Polymer D | 60 | 50 | 50 | 40 | — |
| Stabilizer 1 | 0.2 | 0.2 | 0.2 | 0.2 | — |
| Polymer F | — | — | — | — | 100 |

*Polymer A - a propylene homopolymer, in flake form, having a MFR of 12 dg/min.
Polymer B - an oelfin polymer composition containing 35% of a propylene homopolymer and 65% of an ethylene-butene copolymer containing 53% ethylene, wherein said composition has a xylene solubles content of 23%.
Polymer D - a propylene polymer material containing (a) 40% propylene homopolymer, (b) 10% semi-crystalline, essentially linear propylene-ethylene copolymer fraction and (c) 50% of an amorphous ethylene-propylene copolymer fraction, which composition has a xylene solubles content of 51%.
Polymer F - a propylene polymer composition of 67% propylene-ethylene random copolymer having 97% of polymerized propylene units and 33% propylene-ethylene copolymer having 63% of polymerized ethylene units, and 0.20% of Stabilizer 1, which composition has a xylene soluble content of 25% and a MFR of 10.5 dg/min.
Stabilizer 1 - Irganox B-225 2,2-bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate stabilizer and tris(2,4-di-tert-butylphenyl)phosphite stabilizer in a 50:50 blend.

TABLE 3B

| PROPERTIES | EX 10 | EX 11 | EX 12 | EX 13 | CON 1 |
|---|---|---|---|---|---|
| Melt Flow | 4.4 | 4.9 | 4.7 | 5.4 | 11.5 |
| IMV | 960 | 650 | 810 | 660 | 370 |
| Spec. Grav. | 0.89 | 0.89 | 0.89 | 0.89 | 0.89 |
| Tensile Str. @ Yield, psi | 2000 | 2060 | 2400 | 2600 | 2120 |
| Tensile Str. @ Break, psi | 2800 | 3060 | 3240 | 3540 | 3170 |
| Elongation @ Yield, % | 17.4 | 17.9 | 11.8 | 11.7 | 14.7 |
| Elongation @ Break, % | 490 | 545 | 515 | 520 | 585 |
| Flexural Modulus | | | | | |
| 1 × 4 Molded, kpsi | 87 | 82 | 102 | 115 | 83 |
| 1 × 4 Die cut, kpsi | 76 | 73 | 85 | 105 | 83 |
| Hardness D | 56 | 58 | 60 | 63 | 60 |
| Shrink | 11 | 9.8 | 12.1 | 12.5 | 12 |
| Afterbake | 13.4 | 12.6 | 14.9 | 15.6 | 15.9 |
| Dynatup @ −30° C. | | | | | |
| E @ Max, J | 22.8 | 23.4 | 24.6 | 23.5 | 22.4 |
| Total E, J | 37.0 | 37.5 | 37.1 | 40.1 | 37.1 |
| Deflection at Max, mm | 17.1 | 17.0 | 17.1 | 15.7 | 15.3 |
| Total Deflection, mm | 25.5 | 25.5 | 24.8 | 24.5 | 31.4 |
| Fracture mode | Duct | Duct | Duct | Duct | Duct |
| Dynatup @ 23° C. | | | | | |
| E @ Max, J | 15.0 | 15.3 | 15.9 | 16.1 | 14.5 |
| Total E, J | 31.9 | 32.1 | 32.3 | 32.0 | 26.7 |
| Deflection at Max, mm | 18.3 | 18.3 | 18.3 | 17.4 | 16.9 |
| Total Deflection, mm | 39.6 | 31.5 | 31.0 | 29.1 | 28.1 |
| Fracture mode | Duct | Duct | Duct | Duct | Duct |
| Paint Adhesion % Fail | | | | | |
| 1 Pull | 3/10 | P/5 | 8/35 | 5/3 | P/1 |
| 2 Pull | 12/19 | 5/18 | 11/43 | 10/8 | 17/25 |
| 3 Pull | 28/30 | —/28 | 19/— | 52/30 | 20/— |
| 4 Pull | 38/55 | —/31 | 27/57 | 54/48 | 24/28 |
| 5 Pull | 45/57 | —/34 | 45/— | 56/50 | 32/— |
| Taber Scratch @ 180° F. - annealed | Failed @ 22 cycles | Failed @ 11 cycles | Failed @ 62 cycles | Passed @ 100 cycles | Failed @ 4 cycles |

From the above Table 3 one can see that the polyolefin compositions of this invention have less shrinkage and excellent elevated temperature surface durability as compared to control 1.

Example 14

The composition is prepared according to the general procedure of Example 2, except that the composition contains additional stabilizers as set forth in Table 4A.

The physical properties are set forth below in Table 4B.

Example 15

The composition is prepared according to the general procedure of Example 5, except that the composition contains a pigment and additional stabilizers as set forth in Table 4A.

The physical properties are set forth below in Table 4B.

Control 3

The composition is prepared according to the general procedure of Control 1 using the same ingredients, except that the composition contains stabilizers and pigment in the amounts set forth in Table 4A.

The physical properties are set forth below in Table 4B.

Control 4

The composition is prepared according to the general procedure of Control 2 using the same ingredients, except that 0.1% of Stabilizer 5 is used instead of 0.2% in Polymer G, and the composition contains additional stabilizers and a pigment in the amounts set forth in Table 4A.

The physical properties are set forth below in Table 4B.

TABLE 4A

| INGREDIENTS* | CON 3 | CON 4 | EX 14 | EX 15 |
|---|---|---|---|---|
| Polymer G | — | 100 | — | — |
| Polymer A | — | — | 50 | 55 |
| Polymer C | — | — | 30 | 30 |
| Polymer D | — | — | 20 | |
| Polymer E | — | — | — | 15 |
| Polymer F | 100 | — | — | — |
| Pigment | 4 | 4 | 4 | 4 |
| Stabilizer 1 | 0.2 | — | 0.2 | 0.2 |
| Stabilizer 2 | 0.2 | — | 0.2 | 0.2 |
| Stabilizer 3 | 0.2 | 0.2 | 0.2 | 0.2 |

TABLE 4A-continued

| INGREDIENTS* | CON 3 | CON 4 | EX 14 | EX 15 |
|---|---|---|---|---|
| Stabilizer 4 | 0.2 | — | 0.2 | 0.2 |

*Polymer G - a mechanical blend comprising 70% of Profax 6201 propylene homopolymer having a MFR of 20 dg/min. commerically available from HIMONT U.S.A., Inc., 5% of high density polyethylene having a melt index of 6 g/10 min., and density of 0.954 g/cm$^3$ produced by Allied Signal, 25% Epsyn 2506 ethylene-propylene-ethylidene norbornene diene monomer rubber having an ethylene content of 56%, a diene content of 45%, Mooney ML$_{1+4}$@125° C. of 28 and MFR of 5.7 dg/min. available from Copolymer Chemical, 0.20% of Stabilizer 5, 0.10% of Stabilizer 6, 0.20% of Stabilizer 2 and 0.20% of Stabilizer 4.
Polymer A - a propylene homopolymer, in flake form, having a MFR of 12 dg/min.
Polymer C - an olefin polymer composition containing 38% of a propylene homopolymer and 62% of an ethylene-butene copolymer containing 51% ethylene, wherein said composition has a xylene solubles content of 22%.
Polymer D - a propylene polymer material containing (a) 40% propylene homopolymer, (b) 10% semi-crystalline, essentially linear propylene-ethylene copolymer fraction and (c) 50% of an amorphous ethylene-propylene copolymer fraction, which composition has a xylene solubles content of 51%.
Polymer E - a propylene polymer material containing (a) 30% of a propylene-ethylene random copolymer having an ethylene content of 3.3%, (b) 7% of semi-crystalline, essentially linear ethylene-propylene copolymer fraction containing 51.9% ethylene and (c) 63% of an amorphous ethylene-propylene copolymer fraction containing 31.1% ethylene, which composition has a xylene soluble content of 64%.
Polymer F - a propylene polymer composition of 67% propylene-ethylene random copolymer having 97% of polymerized propylene units and 33% propylene-ethylene copolymer having 63% of polymerized ethylene units, and 0.20% of Stabilizer 1, which composition has a xylene soluble content of 25% and a MFR of 10.5 dg/min.
Pigment - Uniform 33-9016 medium grey metallic color concentrate available from Uniform Color Company.
Stabilizer 1 - Irganox B-225 2,2-bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate stabilizer and tris(2,4-di-tert-butylphenyl) phosphite stabilizer in a 50:50 blend.
Stabilizer 2 - Tinuvin 328 2-(2-hydroxy-3,5-di-tertiaryamylphenyl)-2H-benzotriazole.
Stabilizer 3 - Tinuvin 770 bis(2,2,6,6-tetramethyl-4-piperidinyl)sebacate stabilizer.
Stabilizer 4 - Chimassorb 944 N,N'-bis(2,2,6,6-tetra-methyl-4-piperidinyl)-1,6-hexanediamine polymer with 2,4,6-trichloro-1,3,5-trazine and 2,4,4-trimethyl-1,2-pentanamine stabilizer.
Stabilizer 5 - Irganox 1010 2,2-bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzenepropanoate stabilizer.
Stabilizer 6 - Irgafos 168 tris(2,4-di-tert-butylphenyl)phosphite stabilizer.

TABLE 4B

| PROPERTIES | CON 3 | CON 4 | EX 14 | EX 15 |
|---|---|---|---|---|
| Melt Flow | 12.4 | 13 | 8.3 | 9.6 |
| IMV | 286 | 230 | 320 | 288 |
| Spec. Grav. | 0.89 | 0.89 | 0.89 | 0.89 |
| Accelerated Weathering Test | | | | |
| Delta E @ 500 Kj/m$^2$ | 0.43 | 0.34 | 0.36 | 0.34 |
| @ 1000 Kj/m$^2$ | 0.57 | 0.82 | 0.56 | 0.53 |
| @ 1500 Kj/m$^2$ | 1.00 | 1.73 | 1.00 | 0.99 |
| @ 2000 Kj/m$^2$ | 1.18 | 3.07 | 1.23 | 1.22 |
| @ 2500 Kj/m$^2$ | 1.29 | — | 1.34 | 1.37 |

As demonstrated above in Table 4, the compositions of this invention have comparable or better weatherability over the compositions of Control 3 and 4.

Examples 16 to 20

The compositions are prepared according to the general procedure of Example 2 using the same ingredients, except that the composition contains additives in varying amounts as set forth in Table 5A.

The physical properties are set forth below in Table 5B.

TABLE 5A

| INGREDIENTS* | EX 16 | EX 17 | EX 18 |
|---|---|---|---|
| Polymer A | 50 | 50 | 50 |
| Polymer B | 30 | 30 | 30 |
| Polymer D | 20 | 20 | 20 |
| Talc | 10 | 15 | 30 |
| Calcium Carbonate | — | — | 10 |
| Carbon Black | 4 | 4 | 4 |

TABLE 5A-continued

| INGREDIENTS* | EX 16 | EX 17 | EX 18 |
|---|---|---|---|
| Stabilizer 1 | 0.2 | 0.2 | 0.2 |

*Polymer A - a propylene homopolymer, in flake form, having a MFR of 12 dg/min.
Polymer B - an olefin polymer composition containing 35% of a propylene homopolymer and 65% of an ethylene-butene copolymer contaning 53% ethylene, wherein said composition has a xylene solubles content of 23%.
Polymer D - a propylene polymer material containing (a) 40% propylene homopolymer, (b) 10% semi-crystalline, essentially linear propylene-ethylene copolymer fraction and (c) 50% of an amorphous ethylene-propylene copolymer fraction, which composition has a xylene solubles content of 51%.
Talc - Microtuff "F" talc having an average particle size of 1.5 microns produced by Pfizer.
Calcium carbonate - Gammasperse CS-11 stearate surface modified calcium carbonate having 1.0% stearate produced by Georgia Marble Company.
Carbon Black - Colonial 2447 concentrate 50:50 carbon black and linear low density polyethylene produced by Colonial Rubber.
Stabilizer 1 - Irganox B-225 2,2-bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate stabilizer and tris(2,4-di-tert-butylphenyl) phosphite stabilizer in a 50:50 blend.

TABLE 5B

| PROPERTIES | EX 16 | EX 17 | EX 18 |
|---|---|---|---|
| Melt Flow | 7 | 6.7 | 5.5 |
| Spec. Grav. | 0.97 | 0.99 | 1.07 |
| Tensile Str. @ Yield, psi | 3090 | 3170 | 3150 |
| Tensile Str. @ Break, psi | 3120 | 3180 | 3160 |
| Elongation @ Yield, % | 13 | 15 | 10 |
| Elongation @ Break, % | 590 | 580 | 520 |
| Flex. Modulus 1 × 4 Molded, kpsi | 163 | 167 | 208 |
| Afterbake | 12.1 | 11.9 | 11.4 |
| CLTE −30 50 80 C. × $10^{-5}$ | — | 5.6 | 3.2 |
| Dynatup @ −30° C. | | | |
| E @ Max, J | 24.0 | 23.4 | 22.4 |
| Total E, J | 42.4 | 43.1 | 31.1 |
| Deflection at Max, mm | 13.3 | 13.1 | 13.0 |
| Total Deflection, mm | 23.0 | 23.9 | 17.7 |
| Fracture mode | Duct | Duct | 2 Of 3 Brit |
| Dynatup @ 23° C. | | | |
| E @ Max, J | 19.0 | 18.4 | 18.4 |
| Total E, J | 34.7 | 34.5 | 35.6 |
| Deflection at Max, mm | 17.3 | 17.3 | 17.4 |
| Total Deflection, mm | 27.9 | 28.3 | 29.3 |
| Fracture mode | Duct | Duct | Duct |
| Paint Adhesion % Fail | | | |
| 1 Pull | P/P | P/P | P/P |
| 2 Pull | P/P | P/P | P/P |
| 3 Pull | P/P | */1 | P/P |
| 4 Pull | */P | —/2 | P/P |
| 5 Pull | —/1 | —/4 | */P |

It can be seen from the data in Table 5, that the compositions of the present invention maintain an excellent balance of properties and good paintability at high flexural modulus with the addition of mineral fillers.

Examples 19 to 21

The compositions are prepared according the general procedure of Example 1, containing the same ingredients, except that the compositions only contain Polymer A and Polymer B as set forth below in Table 6A.

The physical properties are set forth below in Table 6B.

TABLE 6A

| INGREDIENTS* | CON 1 | CON 2 | EX 19 | EX 20 | EX 21 |
|---|---|---|---|---|---|
| Polymer A | — | — | 60 | 40 | 20 |
| Polymer B | — | — | 40 | 60 | 80 |
| Carbon Black | — | — | — | — | — |
| Stabilizer 1 | — | — | 4 | 4 | 4 |
| Polymer F | 100 | — | 0.2 | 0.2 | 0.2 |

TABLE 6A-continued

| INGREDIENTS* | CON 1 | CON 2 | EX 19 | EX 20 | EX 21 |
|---|---|---|---|---|---|
| Polymer G | — | 100 | — | — | — |

*Polymer A - a propylene homopolymer, in flake form, having a MFR of 12 dg/min.
Polymer B - an olefin polymer composition containing 35% of a propylene homopolymer and 65% of an ethylene-butene copolymer containing 53% ethylene, wherein said composition has a xylene solubles content of 23%.
Carbon Black - Colonial 2447 concentrate 50:50 carbon black and linear low density polyethylene produced by Colonial Rubber.
Stabilizer 1 - Irganox B-225 2,2-bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate stabilizer and tris(2,4-di-tert-butylphenyl) phosphite stabilizer in a 50:50 blend.
Polymer F - a propylene polymer composition of 67% propylene-ethylene random copolymer having 97% of polymerized propylene units and 33% propylene-ethylene copolymer having 63% of polymerized ethylene units, and 0.20% of Stabilizer 1, which composition has a xylene soluble content of 25% and a MFR of 10.5 dg/min.
Polymer G - a mechanical blend comprising 70% of Profax 6201 propylene homopolymer having a MFR of 20 dg/min. commerically available from HIMONT U.S.A., Inc., 5% of high density polyethylene having a melt index of 6 g/10 min., and density of 0.954 g/cm$^3$ produced by Allied Signal, 25% Epsyn 2506 ethylene-propylene-ethylidene norbornene diene monomer rubber having an ethylene content of 56%, a diene content of 4.5%, Mooney ML$_{1+4}$@125° C. of 28 and MFR of 5.7 dg/min. available from Copolymer Chemical, 0.20% of Stabilizer 5, 0.10% of Stabilizer 6, 0.20% of Stabilizer 2 and 0.20% of Stabilizer 4.

TABLE 6B

| PROPERTIES | CON 1 | CON 2 | EX 19 | EX 20 | EX 21 |
|---|---|---|---|---|---|
| Melt Flow | 11.5 | 11.9 | 10.2 | 9.5 | 9.1 |
| IMV | 370 | 300 | 463 | 520 | 539 |
| Spec. Grav. | 0.89 | 0.89 | 0.89 | 0.89 | 0.89 |
| Flexural Modulus | | | | | |
| 1 × 4 Molded, kpsi | 83 | 125 | 128 | 107 | 84 |
| 1 × 4 Die cut, kpsi | 83 | 127 | 150 | 125 | 98 |
| Shrink | 12 | 11.5 | 11.2 | 8.3 | 6.4 |
| Afterbake | 15.9 | 15.2 | 14.6 | 11.6 | 9.8 |
| Taber scratch @ 180° F. - annealed | Fail @ 4 cycles | Fail @ 2 cycles | Pass @ 100 cycles | Pass @ 100 cycles | Pass @ 100 cycles |

It can be seen in Table 6 that the compositions of this invention have improved taber scratch at lower shrinkage across the flexural modulus range of control 1 and 2.

Example 22

The composition is prepared according to the general procedure of Example 1, containing the ingredients and amounts thereof as set forth in Table 7A.

The physical properties are set forth below in Table 7B.

Control 5

The composition is prepared according to the general procedure of Example 22, containing the ingredients and amounts thereof as set forth in Table 7A.

The physical properties are set forth below in Table 7B.

TABLE 7A

| INGREDIENTS* | CON 5 | EX 22 |
|---|---|---|
| Polymer I | 75 | 65 |
| Polymer B | — | 25 |
| Polymer J | 10 | 10 |
| Polymer K | 15 | — |
| Talc | 12 | 12 |

TABLE 7A-continued

| INGREDIENTS* | CON 5 | EX 22 |
|---|---|---|
| Stabilizer 1 | 0.2 | 0.2 |

*Polymer I - a propylene copolymer containing 87% of a propylene homopolymer and 13% of an amorphous ethylene-propylene copolymer having 7% ethylene, wherein total xylene soluble content of 13.7%.
Polymer B - an olefin polymer composition containing 35% of a propylene homopolymer and 65% of an ethylene-butene copolymer containing 53% ethylene, wherein said composition has a xylene solubles content of 23%.
Polymer J - EPO2P ethylene-propylene copolymer rubber having a propylene content of 26% $ML_{1+4}$ @ 100° C. of 24 from JP Synthetic Rubber Company, Ltd.
Polymer K - EBM 2021P ethylene-butene copolymer rubber available from JP Synthetic Rubber Company, Ltd.
Talc - Microtuff "F" talc having an average particle size of 1.5 microns produced by Pfizer.
Stabilizer 1 - Irganox B-225 2,2-bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate stabilizer and tris(2,4-di-tert-butylphenyl) phosphite stabilizer in a 50:50 blend.

TABLE 7B

| PROPERTIES | CON 5 | EX 22 |
|---|---|---|
| Melt Flow, dg/min | 19.3 | 21.1 |
| Flexural Modulus, kpsi | 190 | 190 |
| Shrink,, mils/in | 7.7 | 7.8 |
| Afterbake, mils/in | 10.5 | 9.9 |
| Hardness Rockwell | 50 | 47 |
| Paint Adhesion % Fail | 0 | 0 |
| Notched Izod |  |  |
| @ 23° C., ft-lb/in | 9.5 | 8.4 |
| @ −30° C., ft-lb/in | 0.90 | 1.2 |

It can be seen from the data in Table 7B, that the compositions of the present invention maintain an excellent balance of properties and good paintability with high flexural modulus.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A polyolefin composition comprising:
    (A) from 10 to 80% by weight of a crystalline propylene homopolymer or of a crystalline copolymer of propylene and ethylene or a $C_{4-8}$ alpha-olefin, provide that when the olefin is ethylene, the maximum polymerized ethylene content is about 10%, and when the olefin is a $C_{4-8}$ alpha olefin, the maximum polymerized content thereof is about 20%, and
    (B) from 10 to 80% by weight of an olefin polymer composition prepared by sequential polymerization in two or more stages consisting essentially of:
        (i) from 25 to 50%, by weight, of a crystalline propylene homopolymer with a solubility in xylene at room temperature of less than or equal to 4%, or a crystalline copolymer of propylene with ethylene or a $C_{4-8}$ alpha-olefin having an ethylene or alpha-olefin content 0.5 to 3%, and a solubility in xylene at room temperature of from less than or equal to 4%; and
        (ii) from 50 to 75%, by weight, of an amorphous copolymer of ethylene with a $C_{4-8}$ alpha-olefin, wherein said alpha-olefin content is from 10 to 20%, and said copolymer is from 10 to 40% soluble in xylene at room temperature; and optionally,
    (C) from 10 to 80% by weight of a propylene polymer composition prepared by sequential polymerization in two or more stages selected from the group consisting of:
        (1) a propylene polymer material consisting essentially of:
            (a) from 10 to 60%, by weight, of a crystalline homopolymer polypropylene with isotactic index greater than 90, or of a crystalline propylene copolymer with ethylene, with a $CH_2=CHR$ olefin where R is a 2-6 carbon alkyl radical, or combinations thereof, containing over 85% by weight of propylene and having an isotactic index greater than 85;
            (b) from 8 to 40%, by weight, of a semi-crystalline, essentially linear copolymer fraction containing ethylene and propylene, having an ethylene content of greater than 40%, and insoluble in xylene at room temperature; and
            (c) from 30 to 60%, by weight, of an amorphous ethylene-propylene copolymer fraction containing optionally small proportions of a diene, soluble in xylene at room temperature and containing 40 to 70% by weight ethylene, wherein individual components (a), (b), and (c) are present in amounts equal to 100%; or
        (2) a propylene polymer composition consisting essentially of:
            (a) from 10 to 50% of a propylene homopolymer having an isotactic index of from 80 to 98%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii), wherein said copolymer contains from 85 to 99%, propylene and having an isotactic index greater than 80 to 98%;
            (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, of both ethylene and alpha-olefin; and (iii) ethylene and an alpha-olefin, as defined in (a)(ii), containing over 55% up to 98%, of said alpha-olefin, which copolymer is insoluble in xylene at room temperature; and
            (c) from 40 to 80% of a copolymer fraction, selected from the group consisting of a copolymer of (i) ethylene and propylene wherein the copolymer contains from 20% to less than 40%, ethylene; (ii) ethylene, propylene, and an alpha-olefin, as defined in (a)(ii), wherein the alpha-olefin is present in an amount of from 1 to 10%, and the amount of ethylene and alpha-olefin present is from 20% to less than 40%; and (iii) ethylene and an alpha-olefin, as defined in (a)(ii), containing from 20 to less than 40% of the alpha-olefin, and optionally containing 0.5 to 10%, of a diene, said copolymer fraction being soluble in xylene at ambient temperature, and having an intrinsic viscosity of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is from about 65% to 80%, the weight ratio of (b)/(c) is from 0.1 to about 0.3 and the total content of ethylene or $C_{4-8}$ alpha-olefin or combination thereof in (b+c) is less than 50%, wherein the individual components (a), (b) and (c) are present in amounts equal to 100%; or (D) from 5 to 40% by weight of an olefin rubber selected from an ethylene-propylene copolymer rubber having an ethylene content of from 40 to 80%, or an ethylene-propylene-conjugated diene terpolymer rubber having an ethylene content of from 40 to 77%, and a diene content of from 2 to 10%.

2. The polyolefin composition of claim 1, wherein said composition consist essentially of:

(A) from 10 to 70%, by weight, of a crystalline propylene homopolymer or of a crystalline copolymer of propylene and ethylene or a $C_{4-8}$ alpha-olefin, and (B) from 10 to 70% by weight of an olefin polymer composition consisting essentially of:
  (i) from 25 to 50%, by weight, of a crystalline propylene homopolymer with a solubility in xylene at room temperature of less than or equal to 4%, or a crystalline copolymer of propylene with ethylene or a $C_{4-8}$ alpha-olefin having an ethylene or alpha-olefin content 0.5 to 3%, and a solubility in xylene at room temperature of from less than or equal to 4%; and
  (ii) from 50 to 75%, by weight, of an amorphous copolymer of ethylene with a $C_{4-8}$ alpha-olefin, wherein said alpha-olefin content is from 10 to 20%, and said copolymer is from 10 to 40% soluble in xylene at room temperature.

3. The polyolefin composition of claim 2, wherein component (A) is a crystalline propylene homopolymer and (B) is an olefin polymer composition consisting essentially of:
  (i) from 25 to 50%, by weight, of a crystalline propylene homopolymer with a solubility in xylene at room temperature of less than or equal to 4%, and
  (ii) from 50 to 75%, by weight, of an amorphous copolymer of ethylene with a $C_{4-8}$ alpha-olefin, wherein said alpha-olefin content is from 10 to 20%, and said copolymer is from 10 to 40% soluble in xylene at room temperature.

4. The polyolefin composition of claim 3, further containing from 2 to 50% of at least one mineral filler.

5. The polyolefin composition of claim 1, wherein said composition consist essentially of:

(A) from 10 to 70%, by weight, of a crystalline propylene homopolymer having an isotactic index of greater than 80 or of a crystalline copolymer of propylene and ethylene or a $C_{4-8}$ alpha-olefin having an ethylene content of up to 10%, or a $C_{4-8}$ alpha-olefin content of up to 20%, (B) from 10 to 70%, by weight, of an olefin polymer composition consisting essentially of:
  (i) from 25 to 50% by weight of a crystalline propylene homopolymer with a solubility in xylene at room temperature of less than or equal to 4%, or a crystalline copolymer of propylene with ethylene or a $C_{4-8}$ alpha-olefin having an ethylene or alpha-olefin content of 0.5 to 3%, and a solubility in xylene at room temperature of from less than or equal to 5%, and
  (ii) from 50 to 75% by weight of an amorphous copolymer of ethylene with a $C_{4-8}$ alpha-olefin, wherein said alpha-olefin content is from 10 to 20%, and said copolymer is from 10 to 40% soluble in xylene at room temperature; and (C) from 10 to 70%, by weight, of a propylene polymer composition consisting of a propylene polymer material consisting essentially of:
  (a) from 10 to 60%, by weight, of a crystalline homopolymer polypropylene with isotactic index greater than 90, or of a crystalline propylene copolymer with ethylene, with a $CH_2=CHR$ olefin where R is a 2-6 carbon alkyl radical, or combinations thereof, containing over 85% by weight of propylene and having an isotactic index greater than 85;
  (b) from 8 to 40%, by weight, of a semi-crystalline, essentially linear copolymer fraction containing ethylene and propylene, having an ethylene content of greater than 40%, and insoluble in xylene at room temperature; and
  (c) from 30 to 60%, by weight, of an amorphous ethylene-propylene copolymer fraction containing optionally small proportions of a diene, soluble in xylene at room temperature and containing 40 to 70% by weight ethylene.

6. The polyolefin composition of claim 5, wherein (A) is a crystalline propylene homopolymer.

7. The polyolefin composition of claim 5, wherein (B)(i) is from 35 to 50% and (B)(ii) is from 50 to 65%.

8. The polyolefin composition of claim 5, further containing from 2 to 50% of at least one mineral filler.

9. The polyolefin composition of claim 1, wherein said composition comprising:

(A) from 10 to 70%, by weight, of a crystalline propylene homopolymer having an isotactic index of greater than 80 or of a crystalline copolymer of propylene and ethylene or a $C_{4-8}$ alpha-olefin having an ethylene content of up to 10%, or a $C_{4-8}$ alpha-olefin content of up to 20%, (B) from 10 to 70%, by weight, of an olefin polymer composition consisting essentially of:
  (i) from 25 to 50% by weight of a crystalline propylene homopolymer with a solubility in xylene at room temperature of less than or equal to 4% or a crystalline copolymer of propylene with ethylene or a $C_{4-8}$ alpha-olefin having an ethylene or alpha-olefin content of 0.5 to 3%, and a solubility in xylene at room temperature of from less than or equal to 5%, and
  (ii) from 50 to 75% by weight of an amorphous copolymer of ethylene with a $C_{4-8}$ alpha-olefin, wherein said alpha-olefin content is from 10 to 20%, and said copolymer is from 10 to 40% soluble in xylene at room temperature; and (C) from 10 to 70%, by weight, of a propylene polymer composition consisting of a propylene polymer composition consisting essentially of:
  (a) from 10 to 50% of a propylene homopolymer having an isotactic index of from 80 to 98%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii), wherein said copolymer contains from 85 to 99%, propylene and having an isotactic index greater than 80 to 98%;

(b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, of both ethylene and alpha-olefin; and (iii) ethylene and an alpha-olefin, as defined in (a)(ii), containing over 55% up to 98%, of said alpha-olefin, which copolymer is insoluble in xylene at room temperature; and (c) from 40 to 80% of a copolymer fraction, selected from the group consisting of a copolymer of (i) ethylene and propylene wherein the copolymer contains from 20% to less than 40%, ethylene; (ii) ethylene, propylene, and an alpha-olefin, as defined in (a)(ii), wherein the alpha-olefin is present in an amount of from 1 to 10%, and the amount of ethylene and alpha-olefin present is from 20% to less than 40%; and (iii) ethylene and an alpha-olefin, as defined in (a)(ii), containing from 20 to less than 40%, of the alpha-olefin, and optionally containing 0.5 to 10% of a diene, said copolymer fraction being soluble in xylene at ambient temperature, and having an intrinsic viscosity of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is from about 65% to 80%, the weight ratio of (b)/(c) is from 0.1 to about 0.3 and the total content of ethylene or $C_{4-8}$ alpha-olefin or combination thereof in (b+c) is less than 50%.

10. The polyolefin composition of claim 9, wherein (A) is from 30 to 60% of a crystalline propylene homopolymer having an isotactic index greater than 80.

11. The polyolefin composition of claim 9, wherein (B)(i) is present in an amount of from 35 to 50% and (B)(ii) is present in an amount of from 50 to 65%.

12. The polyolefin composition of claim 9, further containing from 2 to 50% of at least one mineral filler.

13. The polyolefin composition of claim 1, wherein said composition comprises:

(A) from 10 to 70%, by weight, of a crystalline propylene homopolymer or of a crystalline copolymer of propylene and ethylene or a $C_{4-8}$ alpha-olefin, and (B) from 10 to 70% by weight of an olefin polymer composition consisting essentially of:
  (i) from 25 to 50%, by weight, of a crystalline propylene homopolymer with a solubility in xylene at room temperature of less than or equal to 4%, or a crystalline copolymer of propylene with ethylene or a $C_{4-8}$ alpha-olefin having an ethylene or alpha-olefin content 0.5 to 3%, and a solubility in xylene at room temperature of from less than or equal to 4%; and
  (ii) from 50 to 75%, by weight, of an amorphous copolymer of ethylene with a $C_{4-8}$ alpha-olefin, wherein said alpha-olefin content is from 10 to 20%, and said copolymer is from 10 to 40% soluble in xylene at room temperature; and (D) from 5 to 40% by weight of an olefin rubber selected from an ethylene-propylene copolymer rubber having an ethylene content of from 40 to 80%, or an ethylene-propylene-conjugated diene terpolymer rubber having an ethylene content of from 40 to 77%, and a diene content of from 2 to 10%.

14. The composition of claim 13, wherein (D) is an ethylene-propylene copolymer rubber.

15. The polyolefin composition of claim 13, further containing from 2 to 50% of one or more mineral filler.

* * * * *

UNITED STATES PATENT AND TRADEMARK OFFICE
CERTIFICATE OF CORRECTION

PATENT NO. : 5,360,868
DATED : November 1, 1994
INVENTOR(S) : Douglas D. Mosier et al.

It is certified that error appears in the above-indentified patent and that said Letters Patent is hereby corrected as shown below:

At col. 5, line 47, change "2v" to --2$\nu$--.

At col. 5, line 48, change "2v" to --2$\nu$--.

At col. 5, line 49, change "v" to --$\nu$--.

At col. 14, line 9, change "45%" to --4.5%--.

Signed and Sealed this

Eighteenth Day of July, 1995

Attest:

BRUCE LEHMAN

Attesting Officer    Commissioner of Patents and Trademarks